(12) United States Patent
Chippaux et al.

(10) Patent No.: US 11,207,855 B2
(45) Date of Patent: Dec. 28, 2021

(54) MACHINE AND METHOD FOR MANUFACTURING AN OPHTHALMIC ARTICLE BY CASTING

(71) Applicant: ESSILOR INTERNATIONAL, Charenton-le-Pont (FR)

(72) Inventors: Laurent Chippaux, Charenton-le-Pont (FR); Somporn Wichitworatham, Bangkok (TH); Natrada Wiwattanapongpan, Bangkok (TH)

(73) Assignee: Essilor International, Charenton-le-Pont (FR)

( * ) Notice: Subject to any disclaimer, the term of this patent is extended or adjusted under 35 U.S.C. 154(b) by 329 days.

(21) Appl. No.: 16/310,317

(22) PCT Filed: Jun. 13, 2017

(86) PCT No.: PCT/EP2017/064369
§ 371 (c)(1),
(2) Date: Dec. 14, 2018

(87) PCT Pub. No.: WO2017/216143
PCT Pub. Date: Dec. 21, 2017

(65) Prior Publication Data
US 2019/0344517 A1    Nov. 14, 2019

(30) Foreign Application Priority Data
Jun. 17, 2016   (EP) .................................... 16305742

(51) Int. Cl.
*B29D 11/00* (2006.01)
(52) U.S. Cl.
CPC .. *B29D 11/00528* (2013.01); *B29D 11/00413* (2013.01)
(58) Field of Classification Search
CPC .................... B29D 11/00528; B29D 11/00413
See application file for complete search history.

(56) References Cited

U.S. PATENT DOCUMENTS

| 5,213,825 A | 5/1993 | Shimizu et al. |
| 8,562,781 B2 * | 10/2013 | Habassi ..................... C09J 7/22 |
| | | 156/247 |

(Continued)

FOREIGN PATENT DOCUMENTS

| EP | 1410889 | 4/2004 |
| EP | 2889113 | 7/2015 |

(Continued)

OTHER PUBLICATIONS

International Search Report and Written Opinion issued in International Application No. PCT/EP2017/064369, dated Sep. 1, 2017.

*Primary Examiner* — Mathieu D Vargot
(74) *Attorney, Agent, or Firm* — Norton Rose Fulbright US LLP

(57) ABSTRACT

The invention provides a machine for manufacturing an ophthalmic article molded by casting and having a straight peripheral edge, comprising a mold assembly (2) having first and second molding shells (10, 13) provided with first and second predetermined molding surfaces (12, 14) and facing to each other, an adhesive tape member (20) joining said shells for forming a molding cavity (8), having a Young's modulus greater than 200 MPa and a maximum shear stress smaller than 0.05 MPa when measured at a temperature of polymerization of a molding material, and also configured to form a peripheral case of the mold assembly in which said first molding shell is able to be displaced relative to the second molding shell without affecting an intermediate portion (22) of the adhesive tape member which define said cavity, and a filling aperture formed in said adhesive tape member for introducing by casting said material into said cavity for forming the article.

17 Claims, 3 Drawing Sheets

(56) References Cited

U.S. PATENT DOCUMENTS

2004/0021238 A1    2/2004   Reed et al.
2012/0013030 A1    1/2012   Kadowaki et al.

FOREIGN PATENT DOCUMENTS

| JP | 2002-294179 | * | 10/2002 |
| KR | 10-2012-0102091 | * | 9/2012 |

* cited by examiner

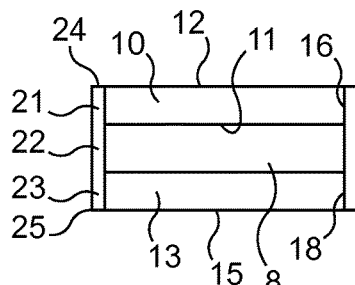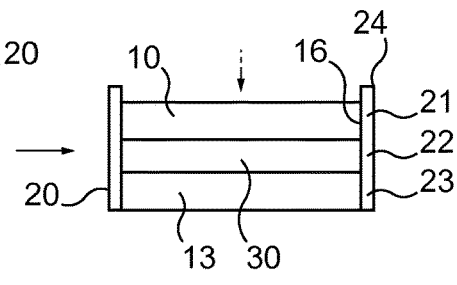
Fig. 4A  Fig. 4B
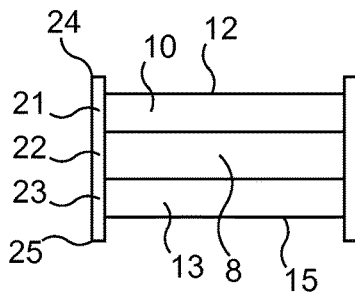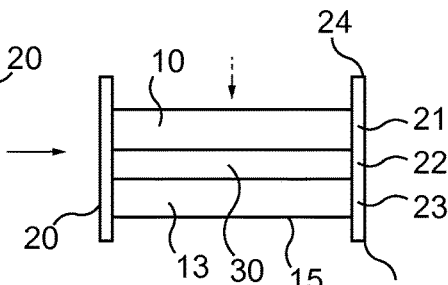
Fig. 5A  Fig. 5B
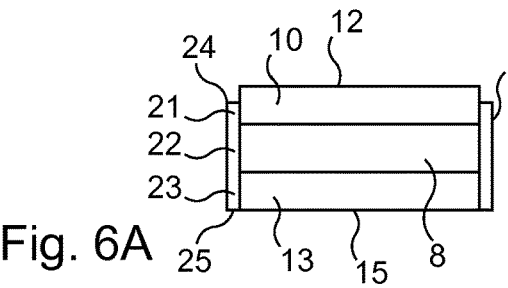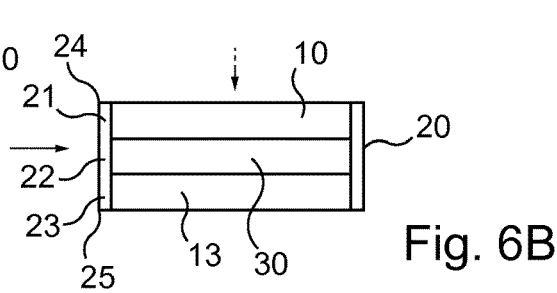
Fig. 6A  Fig. 6B
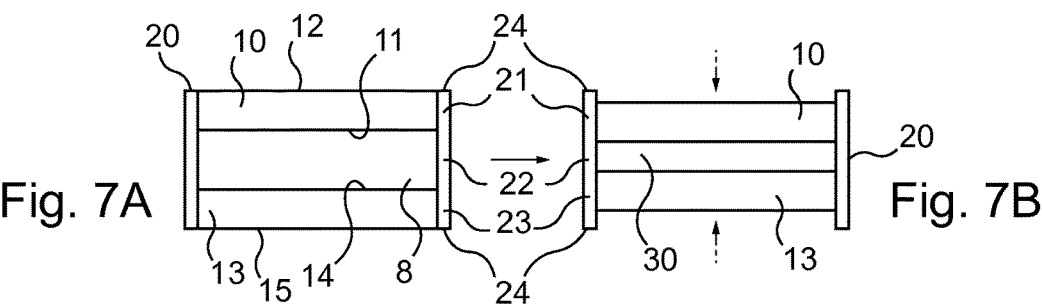
Fig. 7A  Fig. 7B
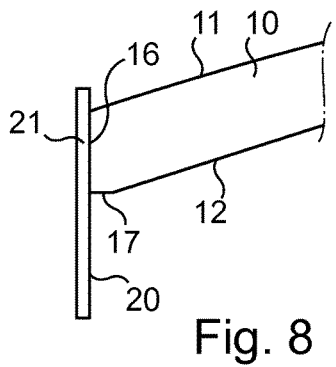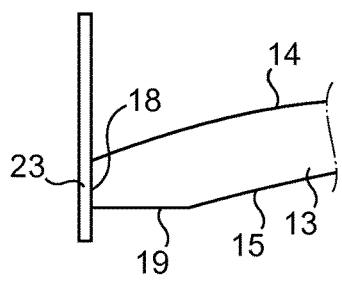
Fig. 8  Fig. 9

MACHINE AND METHOD FOR MANUFACTURING AN OPHTHALMIC ARTICLE BY CASTING

CROSS-REFERENCE TO RELATED APPLICATIONS

This application is a national phase application under 35 U.S.C. § 371 of International Application No. PCT/EP2017/064369 filed 13 Jun. 2017, which claims priority to European Patent Application No. 16305742.5 filed 17 Jun. 2016. The entire contents of each the above-referenced disclosures is specifically incorporated by reference herein without disclaimer.

FIELD OF THE INVENTION

The invention relates in general to manufacturing ophthalmic articles and in particular to a machine for molding by casting an ophthalmic lens.

The invention further relates to a method configured to be carried out by such a machine for molding by casting an ophthalmic lens.

BACKGROUND ART

The international patent application WO 2015/097245 discloses a machine and a method for molding by casting an ophthalmic lens, and in particular for an automated filling of a mold assembly of the machine.

The machine comprises a mold assembly formed by two molding shells and an annular closure member configured to join the shells and define a molding cavity.

The shells are made of a transparent material and the annular closure member is made by a scotch tape.

The molding cavity is filled by causing a molding material to flow into the molding cavity through a filling aperture provided in the scotch tape.

This filling aperture is at the periphery of the molding shells so as not to interfere with the optically surface of the ophthalmic lens formed.

The molding material is preferably a polymerizable synthetic material, for instance UHI monomer or MR7 or MR8.

The filling of the molding cavity is here made automatically and in a controlled manner thanks to filling means, acquiring means and control means.

Alternatively, the filling of the molding cavity can be made manually rather than automatically.

Once the molding cavity is fully filled with the molding material, the latter is polymerized thanks to a polymerization device, comprising for instance a lighting and heating source such as a UV source.

Such machine and method carried by the machine allow providing an ophthalmic lens which generally needs to be further processed.

In particular, the lens may comprise some irregularities on its peripheral edge, for instance a wrinkle defect, a twist defect, or a sticky surface defect.

SUMMARY OF THE INVENTION

The invention is directed to a similar kind of machine and method for manufacturing an ophthalmic article, which machine and method are improved while remaining simple to implement, compact and economic.

The invention accordingly provides a machine for manufacturing an ophthalmic article, comprising a mold assembly having a first molding shell provided with a first predetermined molding surface, a second molding shell provided with a second predetermined molding surface which is arranged for facing the first predetermined molding surface of the first molding shell, an adhesive tape member configured to join said first and second molding shells for forming a sealed molding cavity defined generally by said first and second predetermined molding surfaces and also laterally at least by an intermediate portion of said adhesive tape member, and a filling aperture formed in said adhesive tape member for introducing by casting a predetermined volume of a polymerizable molding material into said molding cavity for forming said ophthalmic article; said adhesive tape member having a Young's modulus greater than around 200 MPa, when measured at around a temperature of polymerization of said polymerizable molding material, and a maximum shear stress smaller than around 0.05 MPa, when measured at around said temperature of polymerization, and being configured to form a peripheral case of the mold assembly, peripheral case in which at least said first molding shell is able to be displaced relative to the second molding shell without affecting said intermediate portion of the adhesive tape member; by virtue of which the ophthalmic article molded by casting has a straight peripheral edge.

The machine according to the invention allows to provide an opthalmic article and in particular an ophthalmic lens, which has an acceptable peripheral edge.

In other words, the peripheral edge of the lens formed is straight and without wrinkle defect, twist defect or sticky surface which would imply to further processing after molding by casting.

In particular, when the molding material which includes monomers is polymerised, the predetermined volume of matter diminishes inside the mold cavity, despite a thermal dilatation.

This is due to the fact that the polymers formed are better arranged and takes less place than the individual monomers.

Accordingly, a negative pressure is applied inside the mold cavity by the polymers.

In the present invention, such a negative pressure does not affect the adhesive tape member and in particular its intermediate portion, either directly or indirectly. In other words, the adhesive tape member is not deformed by the pressure inside the mold cavity and is not deformed and displaced either due to the diminishing of the predetermined volume of matter, also called shrinkage, or due to the inherent displacement of the at least one molding shell relative to the other.

Therefore, in the machine according to the invention, the adhesive tape member forms a cylindrical tube, also called peripheral case or peripheral belt, in which the at least one molding shell slides relative to the other molding shell, without wrinkling the adhesive tape member.

In the present invention, the adhesive tape member is characterized with mechanical and elastic properties by its Young's modulus and by its maximum shear stress.

The values of Young's modulus and maximum shear stress may be obtained at a predetermined temperature value of around 130° C., which is a temperature value close to the temperature in the mold cavity during polymerization of a MR8 molding material; or at a predetermined temperature value comprised between around 110° C. and around 120° C., which is a temperature value close to the temperature in the mold cavity during polymerization of a MR7 molding material.

MR7 and MR8 materials are materials often used in the field of ophthalmics in order to manufacture optical lenses, especially lenses for spectacle glasses.

Other corresponding values of Young's modulus and maximum shear stress could be obtained at a different temperature value than 130° C., or 110° C. or 120° C.

For instance, the adhesive tape member might have a Young's modulus greater than around 500 MPa, preferably greater than 700 MPa, more preferably greater than 900 MPa, when measured at around 80° C., and a maximum shear stress smaller than around 0.25 MPa, preferably smaller than 0.1 MPa, when measured at around 80° C.

The properties of the adhesive tape member are obtained by the properties of the glue and of the film that comprises said adhesive tape member.

The properties may be derived from the holding power, the adhesion failure or Peel adhesion, the tensile strength, the tape (or film) thickness and the material used forming the glue and the film.

It will be noted that the glue has fluidic properties and sealing properties, and that the adhesive tape member provides enough rigidity, so that the mold shells may slide preferably without crumpling the adhesive tape member, at least from around 75° C. to around 130°.

It will be noted that the acceptability of the ophthalmic lens formed with the machine may be defined substantially according to the measurement of a wrinkle defect.

At this stage, the opthalmic lens may be finished or semi-finished.

The wrinkle defect measurement may be implemented by measuring the number of wrinkle defects along the peripheral edge of the lens formed and further the depth of the wrinkle defect observed.

A visual inspection may be done for locating the wrinkle defects on the peripheral edge and the depth of the wrinkle defects identified may be measured with a metrology equipment including a support and a control device.

An acceptable lens may be defined for instance as being a lens having less than three or three wrinkle defects along its peripheral edge and further having a maximum wrinkle depth smaller or equal to around 0.5 mm.

By contrast, a lens having for instance more than three wrinkle defects along its peripheral edge or at least one wrinkle of depth greater than around 0.5 mm could be considered as being unacceptable.

The machine according to the invention allows providing acceptable ophthalmic lens molded by casting.

According to features preferred as being very simple, convenient and economical, the machine furthermore comprises a polymerization device configured to polymerize said polymerizable molding material into said molding cavity at said polymerization temperature for forming said ophthalmic article.

The intermediate portion of the adhesive tape member is not deformed during the polymerization of the polymerizable molding material which is subjected to the polymerization temperature, despite the shrinkage phenomen disclosed above, which shrinkage phenomen could be equated to a given pulling force applied on the polymerizable molding material.

Therefore, in the machine according to the invention, the cylindrical tube formed by the adhesive tape member is not deformed when subjected to polymerization.

According to other features preferred as being very simple, convenient and economical for embodying the machine according to the invention:

said adhesive tape member has a thickness comprised between around 10 μm and around 200 μm, preferably with a thickness greater than around 50 μm;

said adhesive tape member has a Young's modulus preferably greater than around 250 MPa, when measured at said polymerization temperature, and/or a maximum shear stress preferably smaller than around 0.02 MPa, or more preferably smaller than around 0.01 MPa, when measured at said polymerization temperature, said polymerization temperature being taken for instance equal to around 130° C.

It will be noted that for at least one of the polymerizable molding materials, the polymerization temperature may reaches 130° C. Accordingly, the inventors have selected this temperature as an evaluation temperature for the tape. However, an adhesive tape that would be used only for polymerizable materials with smaller polymerization temperature could have their properties be evaluated at smaller polymerization temperatures, such as 100° C. or 120° C. for example.

According to yet other features preferred as being very simple, convenient and economical for embodying the machine according to the invention:

said first and second predetermined molding surface of the first and second molding shells and said intermediate portion of the adhesive tape member are configured to form an ophthalmic article having an optical power comprised between +6 D and −12 D;

said adhesive tape member has a total width determined as a function both of thicknesses of the first and second molding shells and of the optical power of the ophthalmic article to be molded by casting;

said first molding shell has a first peripheral wall, the second molding shell has a second peripheral wall in register with said first peripheral wall, and said adhesive tape member comprises an upper portion surrounding said first peripheral wall and being in contact with at least a part of said first peripheral wall and a lower portion surrounding said second peripheral wall and being in contact with at least a part of said second peripheral wall, the upper and lower portions being joined to each other by said intermediate portion, and at least the upper portion and the intermediate portion have each a width which is determined as a function of the optical power of the ophthalmic article to be molded by casting;

said adhesive tape member has a total width smaller or equal than the total thickness of the first and second molding shells plus a distance between said first and second molding shells before introducing of said molding material into the molding cavity;

said upper portion of the adhesive tape member has a free upper edge and/or said lower portion of the adhesive tape member has a free lower edge which are in contact with said respective first and second peripheral walls of the first and second molding shells, both before introducing of said molding material into the molding cavity and after polymerization thereof;

said upper portion of the adhesive tape member has a free upper edge which protrudes from said first peripheral wall of the first molding shell, before and/or after displacement of said first molding shell in the peripheral case and polymerization of said molding material;

said free upper edge of the upper portion of the adhesive tape member protrudes less than 1.5 mm, preferably between around 0.5 mm to around 1 mm from said first peripheral wall of the first molding shell (as measured in the process conditions, i.e. at room temperature), before displacement of said first molding shell in the peripheral case and polymerization of said molding material;

said lower portion of the adhesive tape member has a free lower edge which protrudes from said second peripheral wall of the second molding shell, before and/or after displacement of said first molding shell in the peripheral case and polymerization of said molding material;

said free upper and lower edges of the upper and lower portions of the adhesive tape member each protrude of less than about 1.5 mm, and preferable between around 0.5 mm and around 1 mm from said first and second peripheral walls of the first and second molding shells (as measured in the process conditions, i.e. at room temperature), before displacement of said first molding shell in the peripheral case and polymerization of said molding material;

said mold assembly is configured to mold by casting an opthalmic article having an optical power comprised between +6 D and +0.25 D and said adhesive tape member has a total width equal to 15 mm; or said mold assembly is configured to mold by casting an opthalmic article having an optical power comprised between 0 D and −6 D and said adhesive tape member has a total width equal to 20 mm; or said mold assembly is configured to mold by casting an opthalmic article having an optical power comprised between −6.25 D and −10 D and said adhesive tape member has a total width equal to 25 mm;

at least the first molding shell has a flat facette formed on the first predetermined surface and joining the latter to a first peripheral wall of said first molding shell; and/or at least the second molding shell has an external surface opposite to the second predetermined surface and at least a straight portion having a constant inclination and joining a second peripheral wall to the external surface of said second molding shell.

The invention also provides a method for manufacturing an ophthalmic article having a predetermined optical power, by using a machine as described above, comprising the steps of:

providing first and second molding shells having respectively a first and a second predetermined molding surfaces;

providing an adhesive tape member having a Young's modulus greater than around 200 MPa, when measured at around a temperature of polymerization of said polymerizable molding material, and a maximum shear stress smaller than around 0.05 MPa, when measured at around a temperature of polymerization of said polymerizable molding material;

arranging the first and second molding shells so that the first predetermined molding surface faces the second predetermined molding surface;

arranging the adhesive tape member to join said first and second molding shells for forming a molding cavity defined generally by said first and second predetermined molding surfaces and also laterally at least by an intermediate portion of said adhesive tape member, said adhesive tape member being configured to form a peripheral case of the mold assembly, peripheral case in which at least said first molding shell is able to be displaced relative to the second molding shell without affecting said intermediate portion of the adhesive tape member;

introducing by casting a predetermined volume of a polymerizable molding material into said molding cavity, thanks to a filling aperture formed in said adhesive tape member;

polymerizing said predetermined volume of molding material for forming said ophthalmic article having a straight peripheral edge, thanks to a polymerization device.

According to features preferred as being very simple, convenient and economical, the method further comprises comprising the step of selecting both the first and second molding shells and/or the adhesive tape member, respectively amongst a plurality of molding shells and adhesive tape members, according to said predetermined optical power of said ophthalmic article to be molded by casting.

According to others features preferred as being very simple, convenient and economical of the method according to the invention:

said adhesive tape member provided has a thickness comprised between around 10 μm and around 200 μm, preferably with a thickness greater than around 50 μm;

said adhesive tape member provided has a Young's modulus preferably greater than around 250 MPa, when measured at said polymerization temperature, and/or a maximum shear stress preferably smaller than around 0.02 MPa, or more preferably smaller than around 0.01 MPa, when measured at said polymerization temperature, said polymerization temperature being for instance equal to around 130° C.;

said ophthalmic article formed thanks to said first and second predetermined molding surface of the first and second molding shells provided and said intermediate portion of the adhesive tape member provided has an optical power comprised between +6 D and −10 D;

said adhesive tape member provided has a total width determined as a function both of thicknesses of the first and second molding shells and of the optical power of the ophthalmic article to be molded by casting;

said first molding shell provided has a first peripheral wall, said second molding shell provided has a second peripheral wall in register with said first peripheral wall, and said adhesive tape member provided comprises an upper portion surrounding said first peripheral wall and being in contact with at least a part of said first peripheral wall and a lower portion surrounding said second peripheral wall and being in contact with at least a part of said second peripheral wall, the upper and lower portions being joined to each other by said intermediate portion, and at least the upper portion and the intermediate portion have each a width which is determined as a function of the optical power of the ophthalmic article to be molded by casting;

said adhesive tape member provided has a total width smaller or equal than the total thickness of the first and second molding shells provided plus a distance between said first and second molding shells before introducing of said molding material into the molding cavity;

said arrangement of the first and second molding shells provided and of the adhesive tape member provided is carried out so that said upper portion of the adhesive tape member has a free upper edge and/or said lower portion of the adhesive tape member has a free lower edge which are in contact with said respective first and second peripheral walls of the first and second molding shells, both before introducing of said molding material into the molding cavity and after polymerization thereof;

said arrangement of the first and second molding shells provided and of the adhesive tape member provided is carried out so that said upper portion of the adhesive tape member has a free upper edge which protrudes from said first peripheral wall of the first molding shell, before and/or after displacement of said first molding shell in the peripheral case and polymerization of said molding material;

said arrangement of the first and second molding shells provided and of the adhesive tape member provided is carried out so that said free upper edge of the upper portion of the adhesive tape member protrudes less than 1.5 mm, preferably between around 0.5 mm to around 1 mm from said first peripheral wall of the first molding shell (as measured in the process conditions, i.e. at room temperature), before displacement of said first molding shell in the peripheral case and polymerization of said molding material;

said arrangement of the first and second molding shells provided and of the adhesive tape member provided is carried out so that said lower portion of the adhesive tape member has a free lower edge which protrudes from said second peripheral wall of the second molding shell, before and/or after displacement of said first molding shell in the peripheral case and polymerization of said molding material;

said arrangement of the first and second molding shells provided and of the adhesive tape member provided is carried out so that said free upper and lower edges of the upper and lower portions of the adhesive tape member each protrude less than 1.5 mm, preferably between around 0.5 mm to around 1 mm from said first and second peripheral walls of the first and second molding shells (as measured in the process conditions, i.e. at room temperature), before displacement of said first molding shell in the peripheral case and polymerization of said molding material;

said mold assembly provided is configured to mold by casting an opthalmic article having an optical power comprised between +6 D and +0.25 D and said adhesive tape member provided has a total width equal to 15 mm; or said mold assembly provided is configured to mold by casting an opthalmic article having an optical power comprised between 0 D and −6 D and said adhesive tape member provided has a total width equal to 20 mm; or said mold assembly provided is configured to mold by casting an opthalmic article having an optical power comprised between −6.25 D and −12 D and said adhesive tape member provided has a total width equal to 25 mm;

said arrangement of the first and second molding shells provided and of the adhesive tape member provided is carried out so that the first predetermined surface of the first molding shell joins a first peripheral wall of said first molding shell by a flat facette formed on said first predetermined surface; and/or said arrangement of the first and second molding shells provided and of the adhesive tape member provided is carried out so that a second peripheral wall of said second molding shell joins an external surface of said second molding shell, which is opposite to the second predetermined surface, by at least a straight portion having a constant inclination.

BRIEF DESCRIPTION OF THE DRAWINGS

The description of the invention now continues with a detailed description of preferred embodiments given hereinafter by way of non-limiting example and with reference to the appended drawings. In these drawings:

FIGS. 4A and 4B to 7A and 7B are partially schematic views of a the mold assembly illustrated in FIG. 2, according to different embodiments and respectively in an empty or no polymerized full state and in a polymerized state;

FIGS. 8 and 9 are partially schematic views of first and second variants of the mold assembly.

DETAILED DESCRIPTION OF PREFERRED EMBODIMENTS

Figure 1:
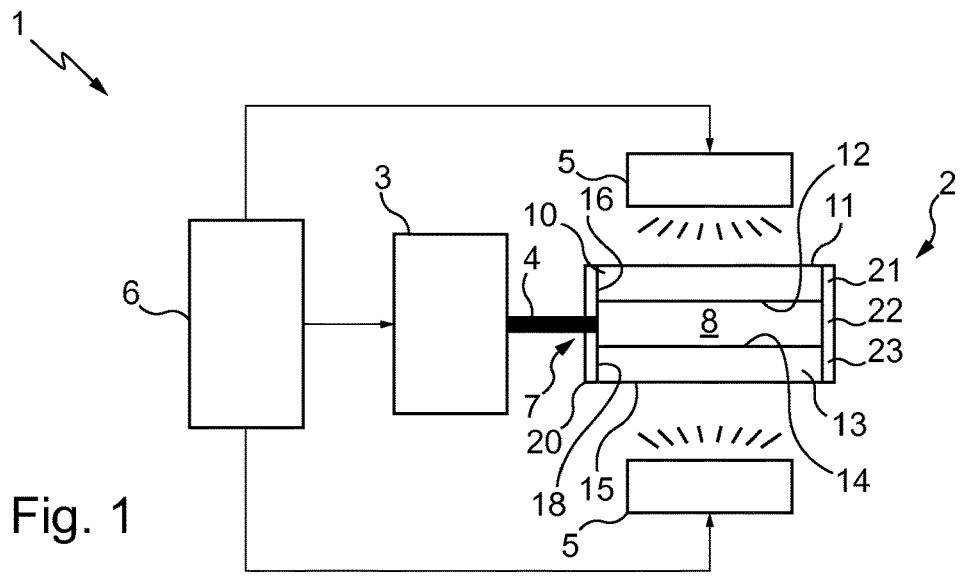
FIG. 1 is a schematic view of a machine for manufacturing an ophthalmic lens according to the invention.
Figures 3A, 3B:
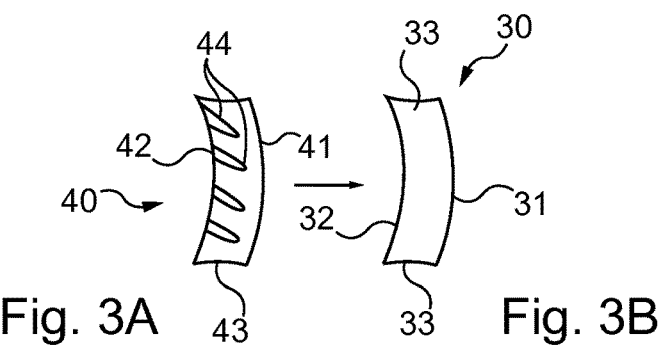
FIGS. 3A and 3B are partially schematic side views of ophthalmic articles obtained respectively with a machine according to the prior art and with the machine illustrated in FIG. 1.

FIG. 1 illustrates a machine 1 for manufacturing an ophthalmic article 30 (shown alone in FIG. 3B).

An ophthalmic article in the present description refers to ophthalmic elements and devices. Non-limiting examples of ophthalmic elements include corrective and non-corrective lenses, including single vision or multi-vision lenses, which may be either segmented or non-segmented, as well as other elements used to correct, protect, or enhance vision, including without limitation magnifying lenses and protective lenses or visors such as found in spectacles glasses, goggles and helmets. The optical article of the present invention is preferably a lens, and more preferably an ophthalmic lens.

The machine 1 comprises a mold assembly 2, a filling device 3 communicating with the mold assembly 2 thanks to a filling duct 4, a polymerization device 5 facing the mold assembly 2, and a control unit 6 here configured to control at least the filling device 3 and the polymerization device 5.

The mold assembly 2 is formed by a first molding shell 10, a second molding shell 13 located in register to the first molding shell 10, the shells 10 and 13 being initially at a predetermined distance one to each other.

The mold assembly 2 is also formed by an adhesive tape member 20 configured to join the first and second molding shells 10 and 13 for forming a sealed molding cavity 8.

The adhesive tape member 20 is arranged for forming a cylindrical tube, also called peripheral case or peripheral belt, surrounding at least partially the first and second molding shells 10 and 13.

The filling device 3 is here configured to fill the sealed molding cavity 8 automatically and in a controlled manner thanks to filling means, acquiring means and control means (not shown), with a polymerizable molding material.

Alternatively, the filling of the molding cavity can be made manually rather than automatically.

The sealed molding cavity 8 is filled by causing a predetermined volume of a polymerizable molding material to flow into the cavity 8 through the duct 4 which communicates with a filling aperture 7 formed in the adhesive tape member 20 and which emerges in the cavity 8.

Figure 2:
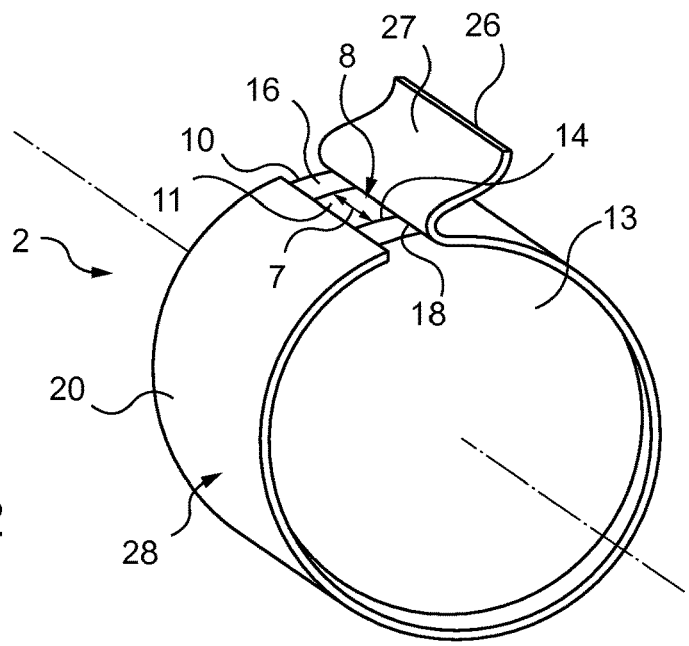
FIG. 2 is a schematic view of a molding assembly of the machine illustrated in FIG. 1.

As visible in FIG. 2, the filling aperture 7 is formed at the periphery of the first and second molding shells 10 and 13 so as not to interfere with an optically surface of the ophthalmic article 30 formed.

For instance, the filling aperture 7 is formed by folding an end portion 26 of the adhesive tape member 20

The polymerization device 5 is here formed by two lighting and heating units such as UV sources, which each face one of the first and second molding shells 10 and 13.

The polymerization device 5 is configured to polymerize the predetermined volume of polymerizable molding material introduced by casting into the sealed molding cavity 8, at a predetermined polymerization temperature, in order to form the ophthalmic article.

The mold assembly 2 is here configured to form an ophthalmic article and in particular an ophthalmic lens 30, having an optical power comprised for instance between +6 D and −12 D.

The molding material is preferably a polymerizable synthetic material, for instance an ultra high index (UHI) monomer or MR7 or MR8.

We will now describe in detail the mold assembly 2, in particular the first and second molding shells 10 and 13 and the adhesive tape member 20.

The first and second molding shells 10 and 13 are here made of a transparent material and have each a diameter comprised for instance between 71 mm and 80 mm.

The first molding shell 10 is provided with a first predetermined molding surface 12, with a first external surface 11 opposite to the first predetermined molding surface 12 and with a first peripheral wall 16 joining both the first predetermined molding surface 12 and the first external surface 11.

The second molding shell 13 is provided with a second predetermined molding surface 14, with a second external surface 15 opposite to the second predetermined molding surface 14 and with a second peripheral wall 18 joining both the second predetermined molding surface 14 and the second external surface 15.

The molding assembly 2 is arranged so that the first predetermined molding surface 12 faces the second predetermined molding surface 14 and the second external surface 15 is in register with the first peripheral wall 16; while the first and second external surfaces 11 and 15 each face a respective lighting and heating unit 5.

The adhesive tape member 20 is formed by a base layer having inherent mechanical properties and combined with an adhesive layer giving to the adhesive tape member 20 inherent adhesive properties.

The adhesive tape member 20 comprises an upper portion 21 surrounding at least partially the first peripheral wall 16 and being in contact with at least a part of the first peripheral wall 16.

The adhesive tape member 20 comprises a lower portion 23 surrounding at least partially the second peripheral wall 18 and being in contact with at least a part of the second peripheral wall 18.

The upper and lower portions 21 and 23 are joined to each other by an intermediate portion 22 which defines generally together with the first and second predetermined molding surfaces 12 and 14 of the first and second molding shells 10 and 13 the sealed molding cavity 8.

The upper portion 21 and the intermediate portion 22, and optionally the lower portion 23, have each a width which is determined as a function of the optical power of the ophthalmic article 30 to be molded by casting.

The adhesive tape member 20 is characterized with mechanical and elastic properties by its Young's modulus and by its maximum shear stress.

In particular, the adhesive tape member 20 has here a Young's modulus greater than around 200 MPa, when measured at around a temperature of polymerization of the polymerizable molding material, and a maximum shear stress smaller than around 0.05 MPa, when measured at around the temperature of polymerization.

The adhesive tape member 20 has preferably a Young's modulus preferably greater than around 250 MPa, when measured at the polymerization temperature, and/or a maximum shear stress preferably smaller than around 0.02 MPa, or more preferably smaller than around 0.01 MPa, when measured at the polymerization temperature.

The values of Young's modulus and maximum shear stress may be obtained at a predetermined temperature value of around 130° C., which is a temperature value close to the temperature in the mold cavity 8 during polymerization of a MR8 molding material; or at a predetermined temperature value comprised between around 110° C. and around 120° C., which is a temperature value close to the temperature in the mold cavity 8 during polymerization of a MR7 molding material; but other corresponding values of Young's modulus and maximum shear stress could be obtained at a different temperature value than 130° C., or 110° C. or 120° C.

For instance, the adhesive tape member 20 might have a Young's modulus greater than around 500 MPa, preferably greater than 700 MPa, more preferably greater than 900 MPa, when measured at around 80° C., and a maximum shear stress smaller than around 0.25 MPa, preferably smaller than 0.1 MPa, when measured at around 80° C.

The properties of the adhesive tape member 20 are obtained by the properties of the adhesive layer (also called glue) and of the base layer (also called film) that comprises the adhesive tape member 20.

The properties may be derived from the holding power, the adhesion failure or Peel adhesion, the tensile strength, the tape (or film) thickness and the material used forming the glue and the film.

The adhesive tape member 20 has here a thickness comprised between around 10 μm and around 200 μm, preferably with a thickness greater than around 50 μm.

For instance, the adhesive tape member 20 may be one of tapes selected amongst an OKAMOTO tape, a TAKARA D1 tape, a TAKARA D2 tape. It will be noted that these adhesive tapes are not known as being commercial names of tapes but were made on demand by the Okamoto Company and the Takara Company respectively.

The adhesive tape member 20 thus forms a peripheral case of the mold assembly 2, in which the first molding shell 10 is able to be displaced relative to the second molding shell 13 without affecting the intermediate portion 22 of the adhesive tape member 20; by virtue of which the ophthalmic lens 30 molded by casting has a straight peripheral edge 33 (see below in more detail in reference to FIGS. 3A and 3B).

The adhesive tape member 20 has here a total width which is determined as a function both of thicknesses of the first and second molding shells 10 and 13 and of the optical power of the ophthalmic lens 30 to be molded by casting.

For instance, the mold assembly 2 is configured to mold by casting an opthalmic lens 30 having an optical power comprised between +6 D and +0.25 D, the adhesive tape member 20 has a total width equal to 15 mm, the first and second molding shells 10 and 13 have each a diameter equal to 71 mm and have respectively first and second predetermined thicknesses.

In variant, the mold assembly is configured to mold by casting an opthalmic lens 30 having an optical power comprised between 0 D and −6 D, the adhesive tape member 20 has a total width equal to 20 mm, the first and second molding shells 10 and 13 have each a diameter equal to 80 mm and have respectively first and second predetermined thicknesses.

In variant, the mold assembly is configured to mold by casting an opthalmic lens 30 having an optical power comprised between −6.25 D and −12 D, the adhesive tape member 20 has a total width equal to 25 mm, the first and second molding shells 10 and 13 have each a diameter equal to 75 mm and have respectively first and second predetermined thicknesses.

It can be seen that those variants correspond to segmenting many different molding shells of different sizes, and different widths of the adhesive tape member and thus of the intermediate portion thereof, in order to form here three ranges of mold assemblies. This segmentation enables operators to have a simplified job when needing to choose the adhesive tape member to be used for a specific mold assembly. It furthers helps to simplify logistics. Furthermore, it will be noted that the width of the adhesive tape member may preferably be chosen, according to a specific mold assembly, so that the adhesive tape member comprises a free upper edge and/or a free lower edge and/or an upper/lower edge at the level or remote to a respective external surface of a respective molding shell.

The first and second predetermined thicknesses of the respective first and second molding shells 10 and 13 may be equal or different and may vary according to optical power of the opthalmic lens 30 and to the total width of the adhesive tape member 20.

It will be noted that when a polymerizable molding material which includes monomers is polymerised, the predetermined volume of matter diminishes inside the mold cavity 8, despite a thermal dilatation.

This is due to the fact that the polymers formed are better arranged and takes less place than the individual monomers.

A negative pressure is applied inside the mold cavity 8 by the polymers.

Such a negative pressure does not affect the adhesive tape member 20 and in particular its intermediate portion 22, either directly or indirectly.

In other words, the adhesive tape member 20 is not deformed by the negative pressure inside the mold cavity 8 and is not deformed and displaced due to the inherent displacement of the first and second molding shells 10 and 13 relative to the other, resulting to accommodate the negative pressure.

Therefore, the adhesive tape member 20 forms here a peripheral case in which the at least the first molding shell 10 slides relative to the second molding shell 13, furthermore without wrinkling the adhesive tape member 20.

The intermediate portion 22 of the adhesive tape member 20 is not deformed during the polymerization of the polymerizable molding material even when said tape is subjected to the polymerization temperature; and therefore the peripheral case formed by the adhesive tape member 20 is not deformed when subjected to the polymerization temperature.

It will be noted that the acceptability of the ophthalmic lens 30 formed with the machine 1 may be defined substantially according to the measurement of a wrinkle defect.

It will also be noted that after polymerizing the molding material, the opthalmic lens 30 formed may be a finished lens or a semi-finished lens (see FIGS. 3A and 3B).

The opthalmic lens 30 manufactured by using the machine 1 has a first optical surface 31 which is here convex and which has a shape matching with the first predetermined molding surface 12, a second optical surface 32 opposite to the first optical surface 31, which is here concave and which has a shape matching with the second predetermined molding surface 14, and a peripheral edge 33 joining the first and second optical surfaces 31 and 32 (FIG. 3B).

The wrinkle defect measurement may be implemented by measuring the number of wrinkle defects along the peripheral edge 33 of the lens 30 formed and further the depth of the wrinkle defect observed.

A visual inspection may be done for locating the wrinkle defects on the peripheral edge 33 and the depth of the wrinkle defects identified may be measured with a metrology equipment including a support and a control device (not illustrated).

A defect free lens may be defined for instance as being a lens 30 having no defects along its peripheral edge 33.

An acceptable lens 30 may be defined for instance as being a lens 30 having less than three or three wrinkle defects along its peripheral edge 33 and further having a maximum wrinkle depth smaller or equal to around 0.5 mm.

The machine 1 thus allows to provide an opthalmic lens 30 which has at least an acceptable peripheral edge 33, and which has most often a defect free peripheral edge 33.

In other words, the peripheral edge 33 of the lens 30 formed is straight and without wrinkle defect, twist defect or sticky surface which would imply to further processing after molding by casting.

The machine 1 thus allows providing acceptable ophthalmic lens 30 molded by casting.

By contrast, a lens 40 having a convex optical surface 41, a concave optical surface 42 opposite to the convex optical surface 41 and a peripheral edge 43 joining the convex and concave optical surfaces 41 and 42 which has for instance more than three wrinkle defects 44 along its peripheral edge 43 or a wrinkle 44 depth greater than around 0.5 mm could be considered as being unacceptable (FIG. 3A). This might be the case with a machine devoid of the features of the machine 1 described above.

We will now describe in reference to FIGS. 4A and 4B to 7A and 7B the cooperation between the first and second molding shells 10 and 13 and the adhesive tape member 20, before casting the molding material, during polymerization of the molding material and after such a polymerization.

FIGS. 4A and 4B show a mold assembly in which the adhesive tape member 20 has a total width substantially equal to the total thickness of the first and second molding shells 10 and 13 plus the distance between the first and second molding shells 10 and 23, defining the sealed molding cavity 8 before introducing by casting the molding material into this cavity 8.

In particular, before introducing the molding material (FIG. 4A), the upper portion 21 of the adhesive tape member 20 has a free upper edge 24 which is in contact with the first peripheral wall 16 of the first molding shell 10; and the lower portion 23 of the adhesive tape member 20 has a free lower edge 25 which is in contact with the second peripheral wall 18 of the second molding shell 10.

During the introduction of the molding material, the situation remains like in FIG. 4A.

During the polymerization of the molding material (FIG. 4B), the first molding shell 10 is here displaced towards the second molding shell 13 in the peripheral case formed by the adhesive tape member 20, the distance there-between decreases, and the free upper edge 24 of the upper portion 21 of the adhesive tape member 20 protrudes from the first peripheral wall 16 and from the first external surface 11 of the first molding shell 10.

By contrast, the free lower edge 25 of the lower portion 23 of the adhesive tape member 20 does not protrude from the second peripheral wall 18 and from the second external surface 15 of the second molding shell 13.

FIGS. 5A and 5B show a mold assembly in which the adhesive tape member 20 has a total width greater than the total thickness of the first and second molding shells 10 and 13 plus the distance between the first and second molding shells 10 and 23, defining the sealed molding cavity 8 before introducing by casting the molding material into this cavity 8.

In particular, before introducing the molding material (FIG. 5A), both the free upper edge 24 and the free lower edge 25 respectively protrudes from the first peripheral wall 16 and the first external surface 11 of the first molding shell 10, and from the second peripheral wall 18 and the second external surface 15 of the second molding shell 13.

In this case, the free upper and lower edges 24 and 25 each protrudes for instance of around 1 mm from the first and second peripheral walls 16 and 18.

During the introduction of the molding material, the situation remains like in FIG. 5A.

During the polymerization of the molding material (FIG. 5B), the first molding shell 10 is here displaced towards the second molding shell 13 in the peripheral case formed by the adhesive tape member 20, the distance there-between decreases, and both the free upper edge 24 and the free lower edge 25 respectively protrudes even more from the first peripheral wall 16 and the first external surface 11 of the first molding shell 10, and from the second peripheral wall 18 and the second external surface 15 of the second molding shell 13.

The inventors have noticed that as long as the free edges of the adhesive tape member protrude less than about 1.5 mm, preferentially less or equal than about 1 mm during the whole process, a crumpling effect is avoided. Indeed, it is expected that the free edges that protrude are submitted to slight diameter shrinkage at the level of the free edge. Furthermore, when a free edge protrudes more than about 1.5 mm, the shrinkage leads to a contact of the adhesive tape member with the external surfaces of the mold shell, itself leading to limiting the possibility for the mold shell to slide in the casing formed by the adhesive tape member.

FIGS. 6A and 6B show a mold assembly in which the adhesive tape member 20 has a total width smaller than the total thickness of the first and second molding shells 10 and 13 plus the distance between the first and second molding shells 10 and 23, defining the sealed molding cavity 8 before introducing by casting the molding material into this cavity 8.

In particular, before introducing the molding material (FIG. 6A), the free upper edge 24 is in contact with the first peripheral wall 16 of the first molding shell 10; and the free lower edge 25 is in contact with the second peripheral wall 18 of the second molding shell 10.

During the introduction of the molding material, the situation remains like in FIG. 6A.

During the polymerization of the molding material (FIG. 6B), the first molding shell 10 is here displaced towards the second molding shell 13 in the peripheral case formed by the adhesive tape member 20, the distance there-between decreases, and both the free upper edge 24 and the free lower edge 25 remain in contact respectively with the first and second peripheral walls 16 and 18.

In other words, neither the free upper edge 24 nor the free lower edge 25 protrude from the first and second peripheral walls 16 and 18 and from the first and second external surfaces 11 and 15.

FIGS. 7A and 7B show a mold assembly in which the adhesive tape member 20 has a total width substantially equal to the total thickness of the first and second molding shells 10 and 13 plus the distance between the first and second molding shells 10 and 23, defining the sealed molding cavity 8 before introducing by casting the molding material into this cavity 8.

In particular, before introducing the molding material (FIG. 7A), the upper portion 21 of the adhesive tape member 20 has a free upper edge 24 which is in contact with the first peripheral wall 16 of the first molding shell 10; and the lower portion 23 of the adhesive tape member 20 has a free lower edge 25 which is in contact with the second peripheral wall 18 of the second molding shell 10.

During the introduction of the molding material, the situation remains like in FIG. 7A.

During the polymerization of the molding material (FIG. 7B), both the first and second molding shells 10 and 13 are here displaced towards each other in the peripheral case formed by the adhesive tape member 20, the distance there-between decreases, and both the free upper edge 24 and the free lower edge 25 respectively protrudes even more from the first peripheral wall 16 and the first external surface 11 of the first molding shell 10, and from the second peripheral wall 18 and the second external surface 15 of the second molding shell 13.

In FIG. 8, the first molding shell 10 has a flat facette 17 formed on the first predetermined surface 12 and joining the latter to the first peripheral wall 16 of the first molding shell 10.

The upper portion 21 of the adhesive tape member 20 is here in contact at the location of the junction between the flat facette 17 and the first peripheral wall 16.

The flat facette 17 has a length for instance comprised between around 0.2 mm and around 1 mm, preferably equal to around 0.5 mm+/−0.2 mm.

The flat facette 17 is to prevent that a sharp edge having an acute angle is provided on the lens 30 formed.

The flat facette 17 has here an angle relative to the peripheral wall 16 which is comprised between around 80° and around 100°, and preferably equal to around 90°.

Accordingly, once the molding material has been polymerized and a lens 30 is formed and removed from the mold, the lens has a flat facette surrounding the edge of its external surface, instead of having a sharp edge; thus preventing optional issues caused by such a sharp edge when the lens 30 is manipulated.

In FIG. 9, the second molding shell 13 has a straight portion 19, also called chamfer, having a constant inclination and joining the second peripheral wall 18 to the second external surface 15 of the second molding shell 13.

The lower portion 23 of the adhesive tape member 20 is here in contact at the location of the junction between the straight portion 19 and the second peripheral wall 18.

The straight portion 19 may have an inclination comprised between around 0° (excluded) and 90° and may be configured so that the width of the second peripheral wall 18 which is in contact with the lower portion 23 is comprised substantially between around 2 mm and around 5 mm.

The straight portion 19 also allows to control a back-force generated by the contact between the adhesive tape member 20 and the second peripheral wall 18.

Figure 10:
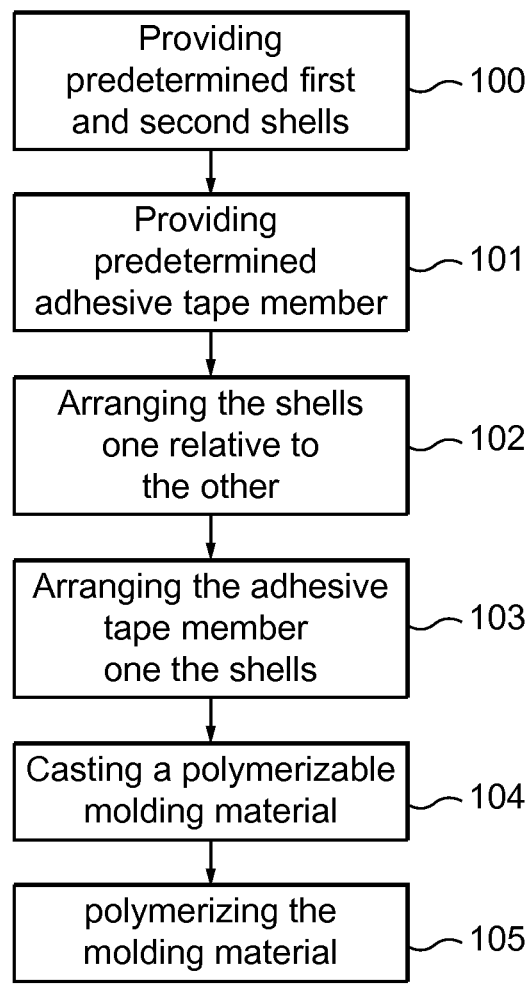
FIG. 10 is a block diagram illustrating steps for manufacturing an ophthalmic lens by using the machine illustrated in FIG. 1.

FIG. 10 is a block diagram illustrating steps for manufacturing the ophthalmic lens 30 by using the machine 1.

The method comprises the step 100 of providing the first and second molding shells 10 and 13 having respectively the first and the second predetermined molding surfaces 12 and 14.

The first and second molding shells 10 and 13 may be selected amongst a plurality of molding shells, according to the predetermined optical power of the ophthalmic lens 30 to be molded by casting.

The method furthermore comprises the step 101 of providing the adhesive tape member 20 having a Young's modulus greater than around 200 MPa, when measured at around the polymerization temperature of the polymerizable molding material, and a maximum shear stress smaller than around 0.05 MPa, when measured at around the temperature of polymerization.

The adhesive tape member 20 may be selected amongst a plurality of adhesive tape members, according to the predetermined optical power of the ophthalmic lens 30 to be molded by casting.

The method furthermore comprises the step 102 of arranging the first and second molding shells 10 and 13 so that the first predetermined molding surface faces the second predetermined molding surface 12 and 14.

The method furthermore comprises the step 103 of arranging the adhesive tape member 20 to join the first and second molding shells 10 and 13 for forming the sealed molding cavity 8 and to form the peripheral case of the mold assembly 2, peripheral case in which at least the first molding shell 10 is able to be displaced relative to the second molding shell 13 without affecting the intermediate portion 22 of the adhesive tape member 20.

The method furthermore comprises the step 103 of introducing by casting the predetermined volume of a polymerizable molding material into the molding cavity 8, thanks to the filling aperture 7 formed in the adhesive tape member 20, to the filling duct 4 and to the filling device 3.

The method furthermore comprises the step 103 of polymerizing the predetermined volume of molding material for forming the ophthalmic lens 30 having a straight peripheral edge 33, without wrinkle defect, thanks to the polymerization device 5.

It should be more generally noted that the invention is not limited to the described and represented examples.

The invention claimed is:

1. A machine for manufacturing an ophthalmic article, comprising a mold assembly having a first molding shell provided with a first predetermined molding surface, a second molding shell provided with a second predetermined molding surface which is arranged for facing the first predetermined molding surface of the first molding shell, an adhesive tape member configured to join said first and second molding shells for forming a sealed molding cavity defined generally by said first and second predetermined molding surfaces and also laterally at least by an intermediate portion of said adhesive tape member, and a filling aperture formed in said adhesive tape member for introducing by casting a predetermined volume of a polymerizable molding material into said molding cavity for forming said ophthalmic article; said adhesive tape member having a Young's modulus greater than around 200 MPa, when measured at around a temperature of polymerization of said polymerizable molding material, and a maximum shear stress smaller than around 0.05 MPa, when measured at around said temperature of polymerization, and being configured to form a peripheral case of the mold assembly, peripheral case in which at least said first molding shell is able to be displaced relative to the second molding shell without affecting said intermediate portion of the adhesive tape member; by virtue of which the ophthalmic article molded by casting has a straight peripheral edge.

2. The machine according to claim 1, wherein said adhesive tape member has a thickness comprised between around 10 μm and around 200 μm.

3. The machine according to claim 1, wherein said adhesive tape member has a Young's modulus greater than around 250 MPa, when measured at said polymerization temperature and/or a maximum shear stress smaller than around 0.02 MPa, when measured at said polymerization temperature.

4. The machine according to claim 1, wherein said first and second predetermined molding surface of the first and second molding shells and said intermediate portion of the adhesive tape member are configured to form an ophthalmic article having an optical power comprised between +6 D and −12 D.

5. The machine according to claim 1, wherein said adhesive tape member has a total width determined as a function both of thicknesses of the first and second molding shells and of the optical power of the ophthalmic article to be molded by casting.

6. The machine according to claim 1, wherein said first molding shell has a first peripheral wall, the second molding shell has a second peripheral wall in register with said first peripheral wall, and said adhesive tape member comprises an upper portion surrounding said first peripheral wall and being in contact with at least a part of said first peripheral wall and a lower portion surrounding said second peripheral wall and being in contact with at least a part of said second peripheral wall, the upper and lower portions being joined to each other by said intermediate portion, and at least the upper portion and the intermediate portion have each a width which is determined as a function of the optical power of the ophthalmic article to be molded by casting.

7. The machine according to claim 6, wherein said adhesive tape member has a total width smaller than or equal to the total thickness of the first and second molding shells plus a distance between said first and second molding shells before introducing of said molding material into the molding cavity.

8. The machine according to claim 6, wherein said upper portion of the adhesive tape member has a free upper edge and/or said lower portion of the adhesive tape member has a free lower edge which are in contact with said respective first and second peripheral walls of the first and second molding shells, both before introducing of said molding material into the molding cavity and after polymerization thereof.

9. The machine according to claim 6, wherein said upper portion of the adhesive tape member has a free upper edge which protrudes from said first peripheral wall of the first molding shell, before and/or after displacement of said first molding shell in the peripheral case and polymerization of said molding material.

10. The machine according to claim 9, wherein said free upper edge of the upper portion of the adhesive tape member protrudes less than 1.5 mm from said first peripheral wall of the first molding shell, before displacement of said first molding shell in the peripheral case and polymerization of said molding material.

11. The machine according to claim 6, wherein said mold assembly is configured to mold by casting an ophthalmic article having an optical power comprised between +6 D and +0.25 D and said adhesive tape member has a total width equal to 15 mm; or said mold assembly is configured to mold by casting an ophthalmic article having an optical power comprised between 0 D and −6 D and said adhesive tape member has a total width equal to 20 mm; or said mold assembly is configured to mold by casting an ophthalmic article having an optical power comprised between −6.25 D and −10 D and said adhesive tape member has a total width equal to 25 mm.

12. The machine according to claim 1, wherein at least the first molding shell has a flat facet formed on the first predetermined surface and joining the latter to a first peripheral wall of said first molding shell.

13. The machine according to claim 1, wherein at least the second molding shell has an external surface opposite to the second predetermined surface and at least a straight portion having a constant inclination and joining a second peripheral wall of said second molding shell to the external surface of said second molding shell.

14. A method for manufacturing an ophthalmic article having a predetermined optical power, by using a machine according to claim 1, comprising the steps of:
  providing first and second molding shells having respectively a first and a second predetermined molding surfaces;
  providing an adhesive tape member having a Young's modulus greater than around 200 MPa, when measured at around a temperature of polymerization of said polymerizable molding material, and a maximum shear stress smaller than around 0.05 MPa, when measured at around a temperature of polymerization of said polymerizable molding material;
  arranging the first and second molding shells so that the first predetermined molding surface faces the second predetermined molding surface;
  arranging the adhesive tape member to join said first and second molding shells for forming a molding cavity defined generally by said first and second predetermined molding surfaces and also laterally at least by an intermediate portion of said adhesive tape member, said adhesive tape member being configured to form a peripheral case of the mold assembly, peripheral case in which at least said first molding shell is able to be displaced relative to the second molding shell without affecting said intermediate portion of the adhesive tape member;
  introducing by casting a predetermined volume of a polymerizable molding material into said molding cavity based on a filling aperture formed in said adhesive tape member;
  polymerizing said predetermined volume of molding material for forming said ophthalmic article having a straight peripheral edge based on a polymerization device.

15. The method according to claim 14, comprising the step of selecting both the first and second molding shells and/or the adhesive tape member, respectively amongst a plurality of molding shells and adhesive tape members, according to said predetermined optical power of said ophthalmic article to be molded by casting.

16. The machine according to claim 3, wherein the adhesive tape member has a maximum shear stress smaller than around 0.01 MPa when measured at said polymerization temperature.

17. The machine according to claim 10, wherein said free upper edge of the upper portion of the adhesive tape member protrudes between around 0.5 mm to 1 mm from said peripheral wall of the first molding shell, before displacement of said first molding shell in the peripheral case and polymerization of said molding material.

* * * * *